March 23, 1971  S. J. COUGHRAN, JR  3,572,411
TREE HARVESTER
Filed Dec. 10, 1968  6 Sheets-Sheet 1
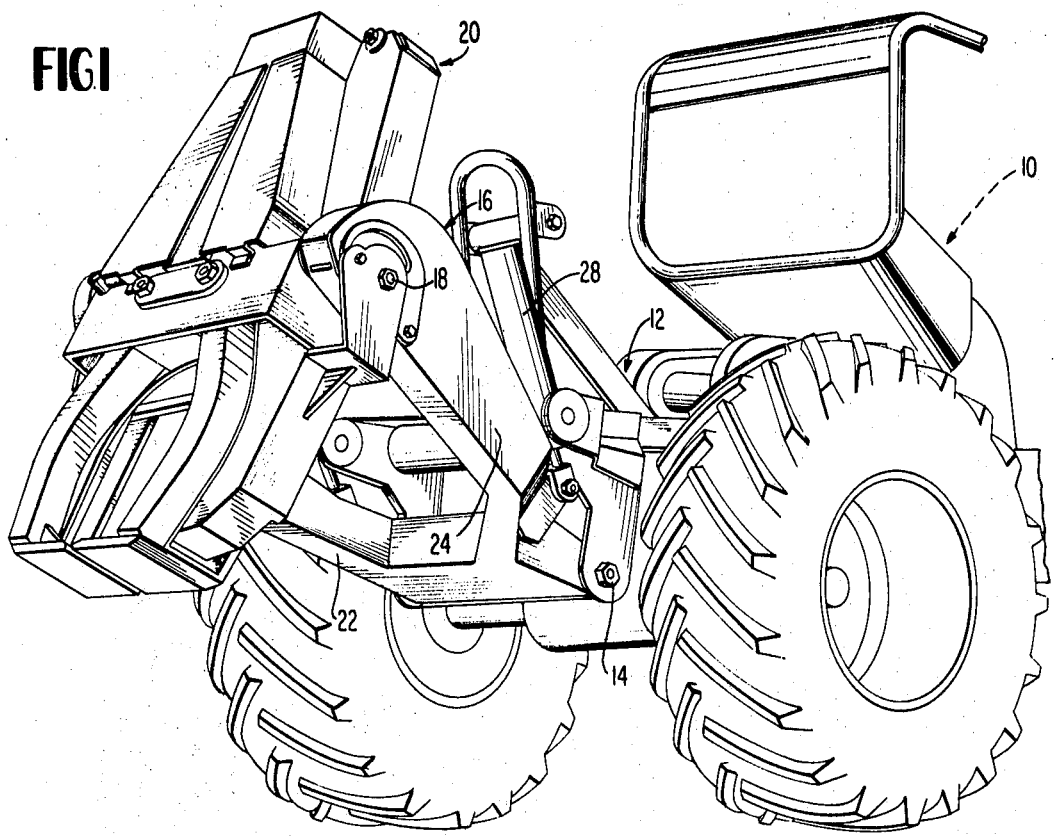
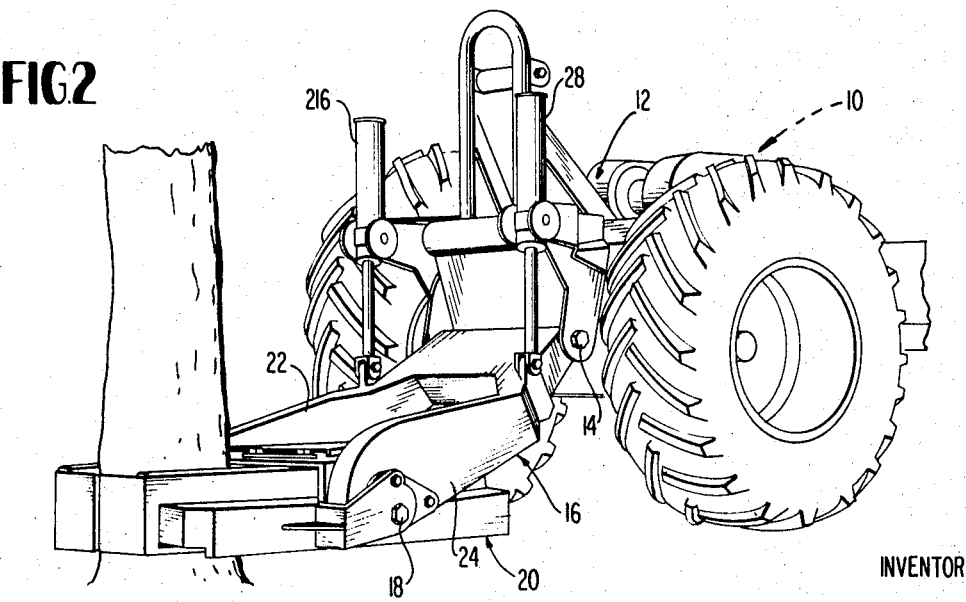
INVENTOR
SAMUEL J. COUGHRAN, JR
BY Newton, Hopkins & Ormsby
ATTORNEYS

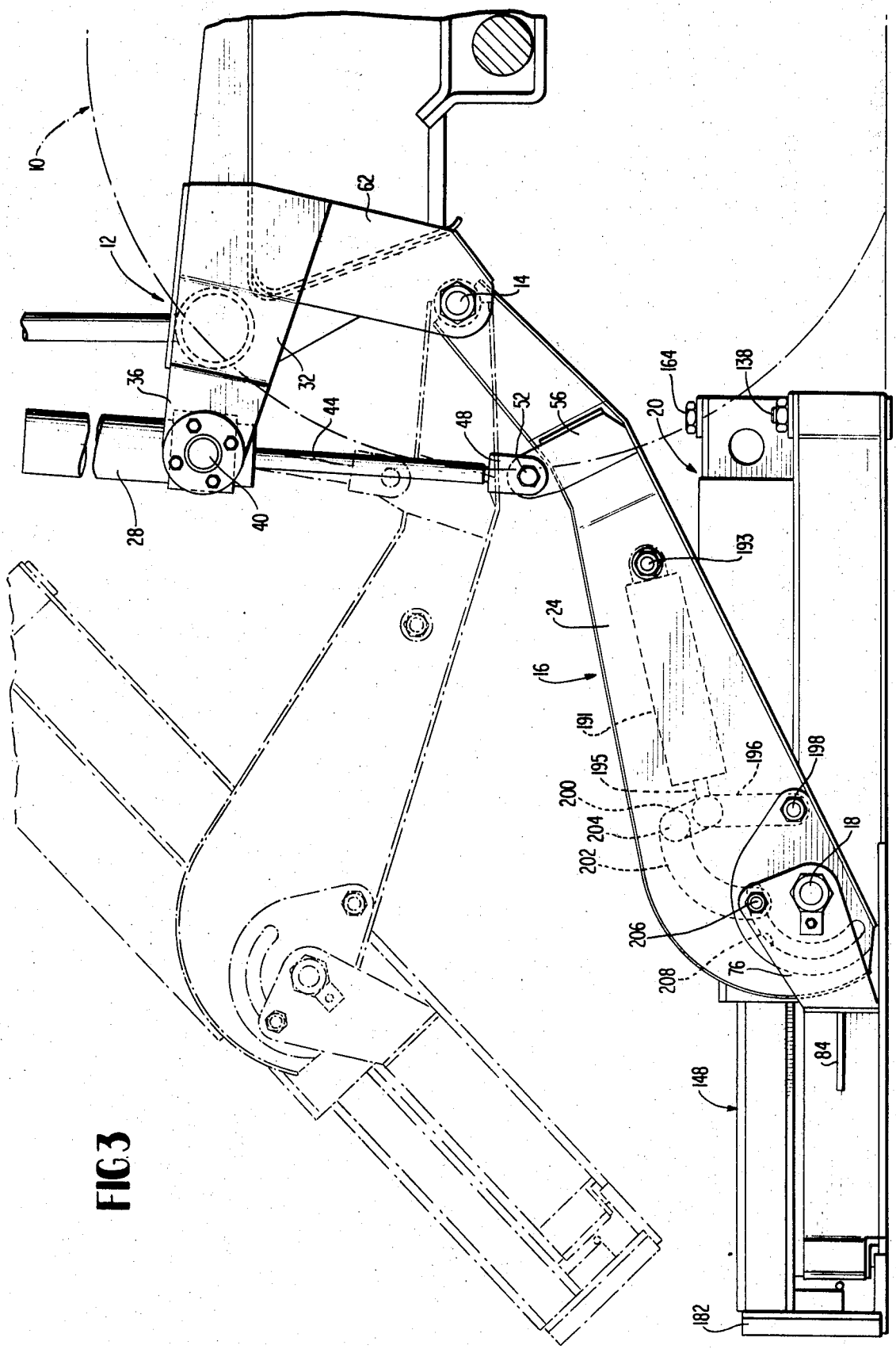

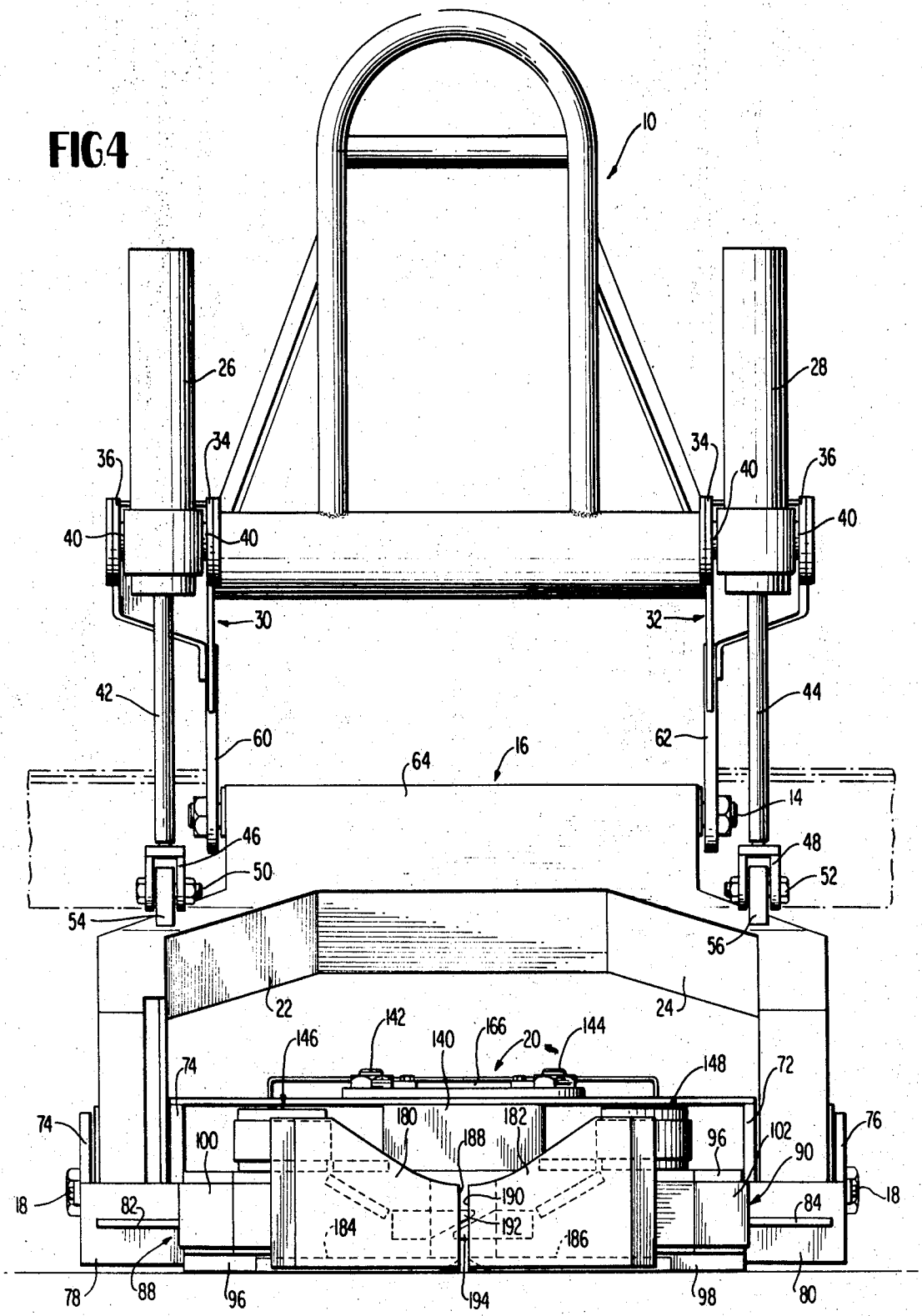

March 23, 1971  S. J. COUGHRAN, JR  3,572,411
TREE HARVESTER
Filed Dec. 10, 1968  6 Sheets-Sheet 4
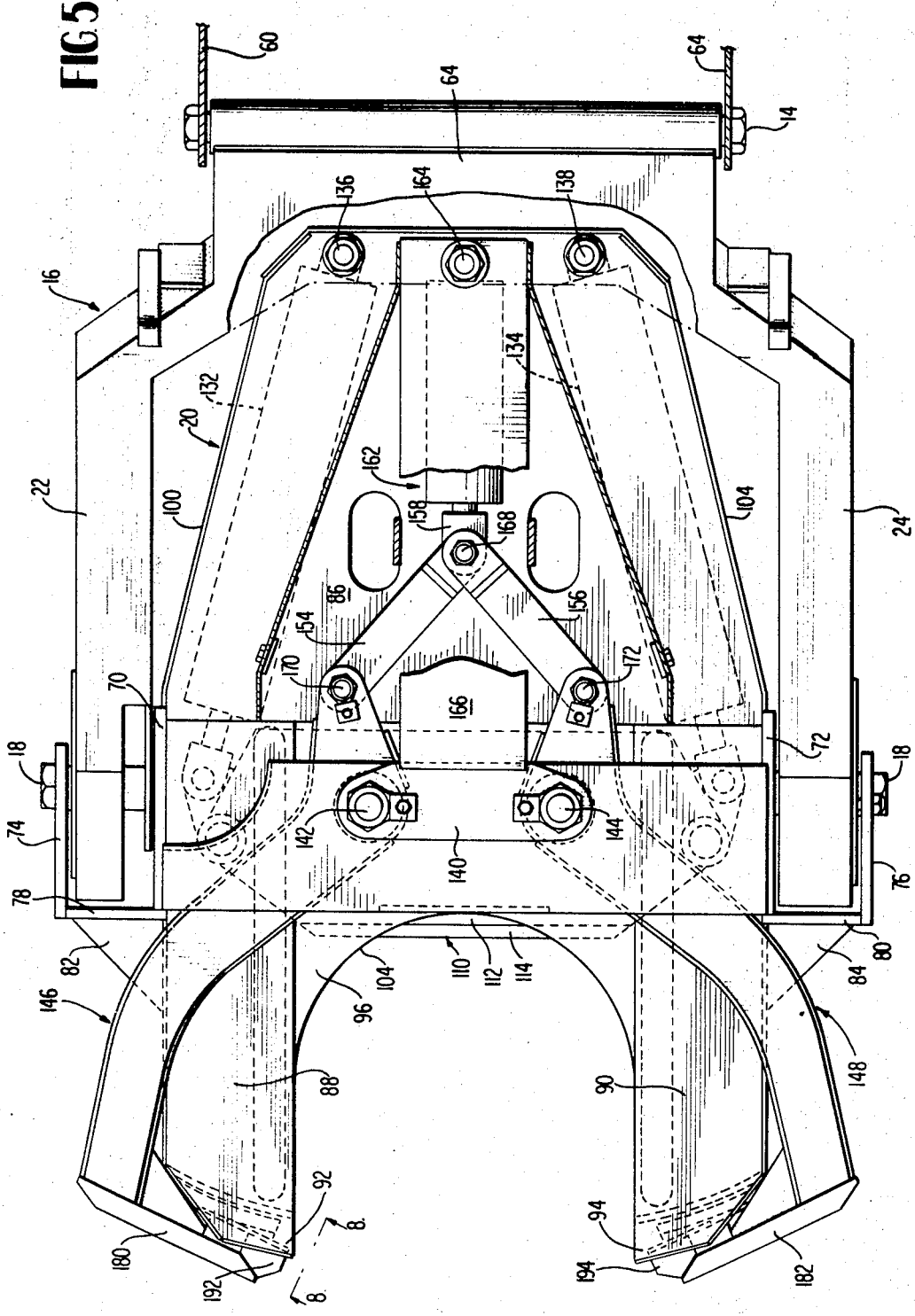

March 23, 1971     S. J. COUGHRAN, JR     3,572,411
TREE HARVESTER
Filed Dec. 10, 1968
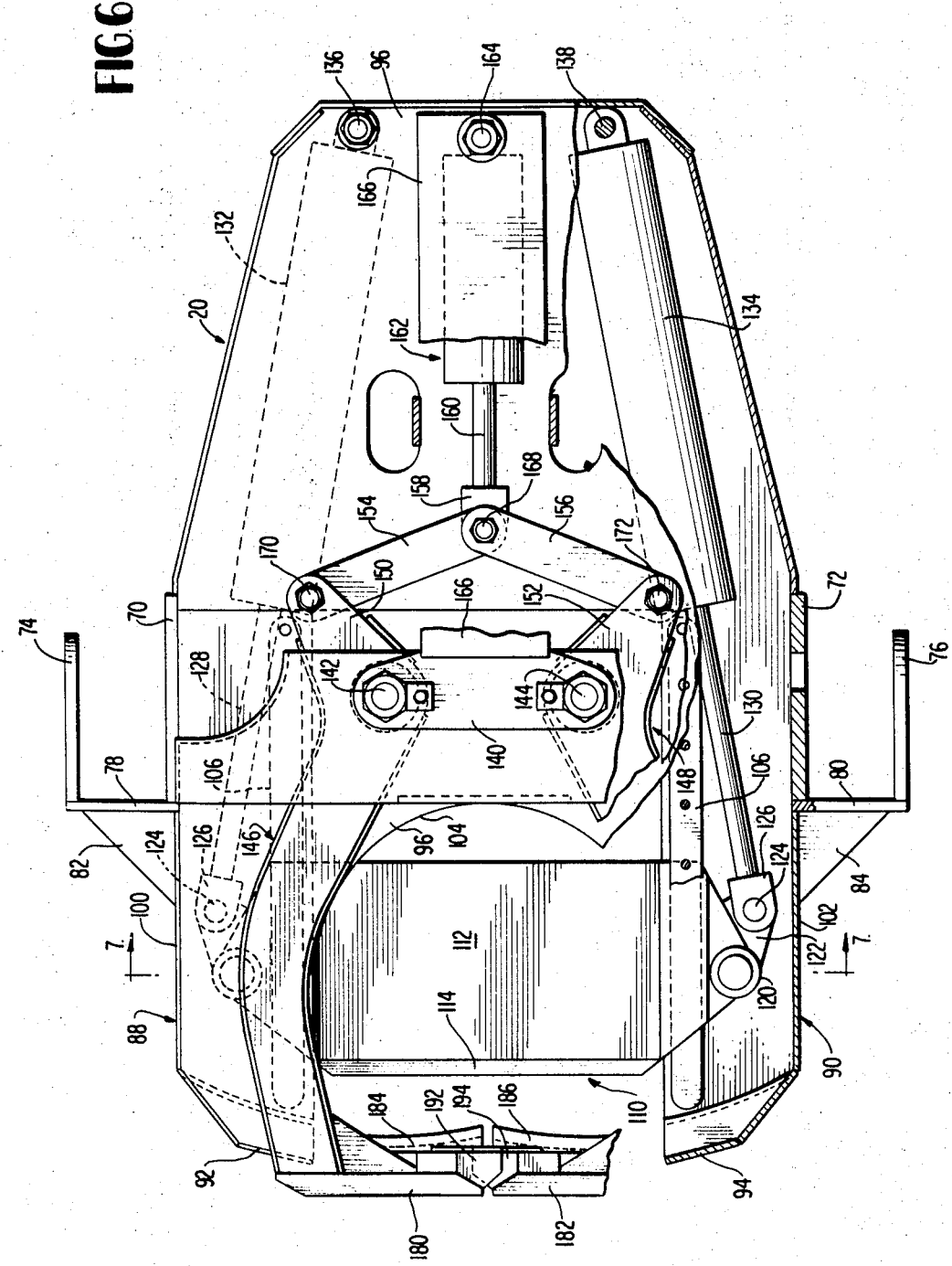

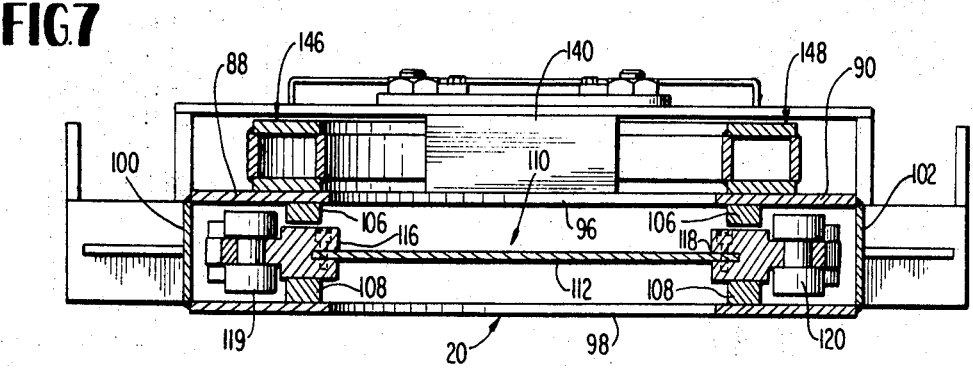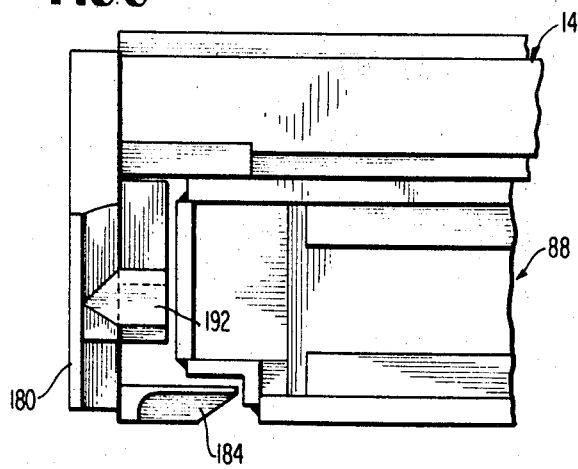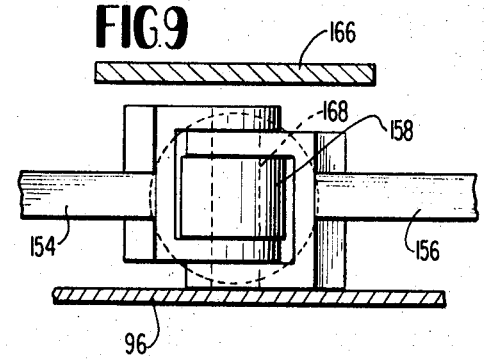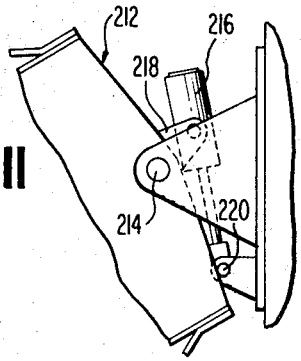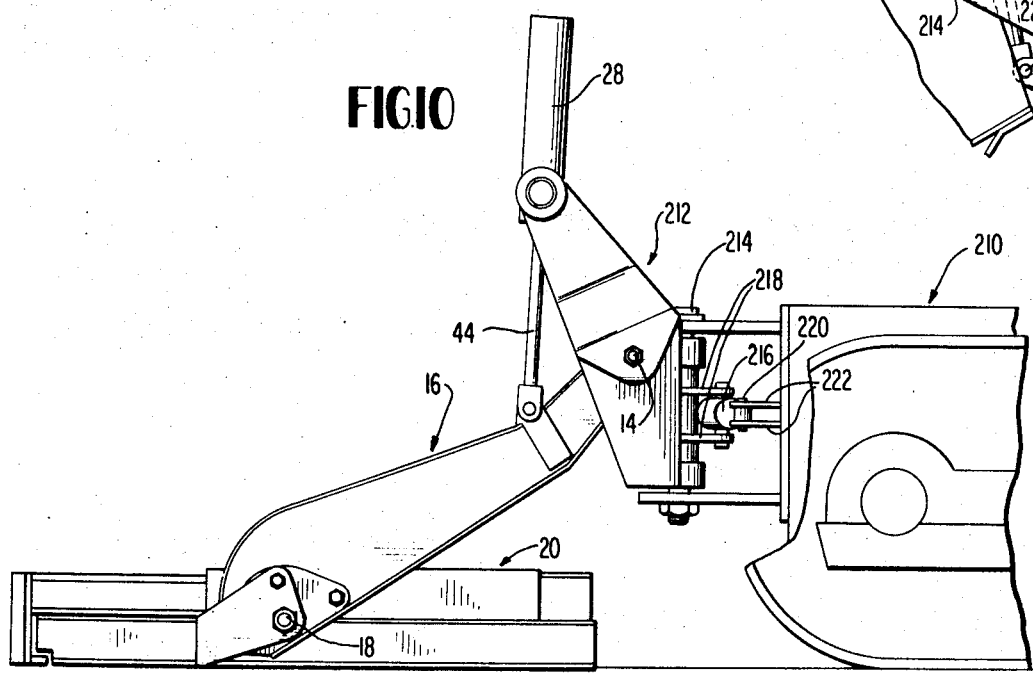

United States Patent Office 3,572,411
Patented Mar. 23, 1971

3,572,411
TREE HARVESTER
Samuel J. Coughran, Jr., Cedartown, Ga., assignor to
Rome Industries, Incorporated, Cedartown, Ga.
Filed Dec. 10, 1968, Ser. No. 782,626
Int. Cl. A01g 23/02
U.S. Cl. 144—3                                   11 Claims

ABSTRACT OF THE DISCLOSURE

A self contained cutter assembly mounted on a tractor vehicle includes a pair of pivoted arms which act not only as a back up for the guillotine shear blade but also as gripping or jaw elements for grasping a tree after it is felled. The cutter assembly is mounted for rotation to allow it to act either as a cutting device or as a grappling device in various positions. The felling, cutting to lengths and topping operations as well as handling, bunching and skidding may all be performed by the device, requiring but a single operator to perform these functions.

BACKGROUND OF THE INVENTION

The logging industry requires the use of special crews for performing certain of the operations, particularly those such as felling, topping and delimbing which conventionally are performed at or near the original site of the tree. In addition to the hazards involved with these operations and the inherent inefficiency of crew operations, delimbing and topping leave a residue of material which presents potential dangers of insect and disease attack as well as fire hazard.

BRIEF SUMMARY OF THE INVENTION

The present invention is concerned with an attachment for powered vehicles such as crawler type or rubber tired tractors, the attachment being effective not only for felling trees but also for grappling and skidding them to a remote bunching site whereat the device may be used further for topping the trees, cutting them to desired lengths and for bunching them for subsequent loading upon a suitable transport vehicle.

The attachment according to the present invention consists essentially of a cutter assembly including a frame which presents a pair of spaced apart leg portions which are adapted to be positioned in straddling relationship to a tree whether the tree be in standing or in horizontal position and, for this purpose, the cutter frame is pivotally mounted upon a carrier frame about a generally horizontal axis and mechanism is provided for swinging and locating the cutter frame about this axis. The legs of the cutter frame present a crotch for receiving the tree trunk, which crotch is open at the free ends of the legs and a pair of pivoted arms are provided which operate in one position thereof to close the gap between the free ends of the legs and thus cooperate with the cutter frame to provide an encircling enclosure for the tree trunk. A guillotine type of shear blade operates between the legs, moving from the crotch toward the free ends of the legs and, as backed up by the free ends of the closed arms which bridge the gap between the legs, the tree is felled in a direction away from the powered vehicle carrying the attachment. The arms are positively actuated by suitable power mechanism for opening and closing movement and, after felling, the arms may be utilized to grapple the felled tree for skidding it to some remote, centralized point whereat the treee may be bunched. Because of the pivoted motion of the cutter frame assembly, not only is the felling operation permitted thereby but also the assembly may be positioned to cut the tree to desired lengths after it has been felled and also to allow topping operations.

BRIEF DESCRIPTION OF THE DRAWING FIGURES

FIG. 1 is a perspective view showing a rubber tired tractor having an attachment according to the present invention mounted thereon;

FIG. 2 is a view similar to FIG. 1 but showing the attachment in position for felling a tree;

FIG. 3 is a side elevational view showing the attachment on enlarged scale;

FIG. 4 is an end elevational view of the attachment;

FIG. 5 is a top plan view, partly in section, showing details of the attachment;

FIG. 6 is a view similar to FIG. 5 but showing the cutter assembly only and with portions thereof broken away to show details of internal construction;

FIG. 7 is a transverse sectional view taken substantially along the plane of section line 7—7 in FIG. 6;

FIG. 8 is an enlarge view as indicated by section line 8—8 in FIG. 5;

FIG. 9 is an enlarged elevation showing the operating mechanism for the grappling arms;

FIG. 10 is a side elevational view showing a slightly modified form of the invention; and FIG. 11 is a partial plan view showing the actuating mechanism associated with the modified form of the invention shown in FIG. 10.

DETAILED DESCRIPTION OF THE INVENTION

With reference at this time more particularly to FIG. 1, the cutter attachment according to the present invention is shown therein attached to a desired conventional type of powered vehicle such as the tractor 10, the attachment consisting essentially of the mounting frame portion indicated generally by the reference character 12 and which pivotally mounts about a horizontal transverse pivot 14 a carrier frame assembly indicated generally by the reference character 16 and the carrier frame assembly 16 in turn mounting, about a horizontal transverse pivot 18 the cutter assembly which is indicated generally by the reference character 20. The carrier frame assembly 16 includes a pair of trailing arms 22 and 24 between which the cutter frame assembly 20 is pivotally mounted by the aforementioned pivot 18 and, as will hereinafter appear, suitable power actuated means is utilized to positively swing and locate the assembly 20 about the pivot 18 relative to the carrier assembly 16. The carrier frame assembly, as may be seen more clearly in FIG. 2, also includes a pair of hydraulic actuators 26 and 28 which are adapted to swing the carrier frame 16 in a vertical direction about the horizontal pivot 14. FIG. 2 illustrates the position of the component parts when the mechanism is in position for felling a tree. It will also be noted from a study of FIGS. 1 and 2 that the trailing arms 22 and 24 of the carrier frame assembly 16 are sufficiently long as to clear the cutter assembly 20 and allow it to be passed therebetween whereby not only may the cutter assembly be horizontally disposed but it may also be vertically disposed and disposed at intermediate positions, the purpose of which will be present hereinafter.

As may be seen in FIGS. 3 and 4, the mounting frame assembly 12 may take the form of a pair of spaced arms 30 and 32 which are bifurcated to present the end portions 34 and 36 which straddle the respective cylinder assemblies 26 and 28 and carry the trunnions 40 thereof between them so as to allow pivotal motion of the cylinders 26 and 28, as will be understood by those skilled in the art. The piston rods 42 and 44 of the assemblies 26 and 28 are provided with clevises 46 and 48 at their lower ends having pivot bolts or pins 50 and 52 coupling them to respective upstanding ears 54 and 56 attached to the carrier frame assembly 16. As may be seen in FIG. 3, the mounting frame assembly 12 includes depending portions 60 and 62 which straddle the main body or bight portion 64 of the carrier frame assembly 16 and which receive the opposite ends of the pivot pin member 14, substantially as is shown.

As is shown in FIGS. 4, 5 and 6, the frame of the cutter assembly 20 includes opposite side wall portions 70 and 72 and corresponding outboard flange portions 74 and 76 connected to the frame by the plates 78 and 80 suitably gusseted as at 82 and 84, the sidewalls and flanges receiving therebetween the free ends of the limbs or arms 22 and 24 and being apertured to receive the pivot pin means 18 which rotatably joins the cutter assembly 20 to the carrier frame assembly 16.

As may be seen, the cutter assembly 20 is of generally flat form and consists of a frame having a main body portion 86 on one side of the pivot means 18 and a pair of legs 88 and 90 which extend away from the pivot means 18 and terminate in free end portions 92 and 94 wide enough apart to receive and straddle a tree trunk therebetween.

As may be seen in FIG. 7, the frame of the cutter assembly consists essentially of a pair of parallel plate members 96 and 98 joined and closed along their outer opposite sides by the plate members 100 and 102, the two plate members being notched as indicated by the reference character 104 in FIG. 5 to present the crotch delineated by the legs 88 and 90 for receiving the tree trunk. Guide rail members 106 and 108 are suitably affixed to the opposing surfaces of the plates 96 and 98 to extend along the legs 88 and 90 slidably guide the guillotine type shear blade assembly indicated generally by the reference character 110.

The blade assembly 110 includes the guillotine type shearing blade 112 having the cutting edge portion 114 and having secured along its opposite sides a pair of carrier blocks 116 and 118 which are slidably received between the aforementioned rails 106 and 108. The carrier blocks 116 and 118, as seen in FIG. 7, are provided with lateral extensions which carry guide roller assemblies 119 and 120 normally clearing the outer sides of the rails 106 and 108 but which are adapted to engage the outer sides thereof and laterally constrain the blade assembly 110. The carrier blocks 116 and 118 also include the ear portions such as that indicated by the reference character 122 in FIG. 6, which ears are apertured to receive the pins 124 by means of which they are coupled to the clevises 126 of the piston rods 128 and 130 of a pair of hydraulic piston and cylinder assemblies 132 and 134 mounted within the cutter frame and which are remotely pinned thereto as by the bolts 136 and 138 to allow of a limited swinging motion necessary incidental to the operation thereof which moves the blade 112 between a retracted position beyond notch 104 to an extended position adjacent the free ends 92 and 94 of the legs 88 and 90.

A pedestal block 140 is fixedly secured to the upper side of the plate 96 and is provided with opposite end bifurcations receiving the pivot pins or bolts 142 and 144 which pivotally mount a pair of back up and grappling arm assemblies indicated generally by the reference characters 146 and 148. The lever ends 150 and 152 of these arms are joined by a pair of links 154 and 156 to the clevis 158 on the piston rod 160 of the hydraulic piston and cylinder assembly 162. The cylinder assembly 162 is pivotally attached as by a pin 164 carried by an overlying frame member 166, see particularly FIGS. 5, 6, and 9, and the underlying plate member 96 to allow some swivelling of the assembly 162 as will be evident hereinafter. The clevis 158 is joined by suitable pivot pin 168 to the links 154 and 156 which are respectively coupled by pins 170 and 172 to the corresponding lever portions 150 and 152 of the arms 146 and 148.

As may be seen in FIG. 7, the arms 146 and 148 may be of hollow box like configuration fabricated as shown and they are provided, at their outer free ends with inwardly directed plate portions 180 and 182 as shown in FIGS. 4 and 6. The arms 146 and 148 overlie the corresponding legs 88 and 90 of the cutter frame and the plates 180 and 182 depend downwardly over the free ends 92 and 94 of the legs and are provided with back up blade portions 184 and 186 overlying the legs 88 and 90, as may be seen also in FIG. 8. These back up blade portions 184 and 186 lie in a plane parallel to the guillotine shear blade 112 but displaced therefrom so as to cooperate therewith and tend to throw a tree being felled in a direction away from the machine to which the attachment is secured.

The opposing edges 188 and 190 of the plates 180 and 182 are provided on their inner sides with overlapping gripper tips 192 and 194 which are particularly effective in performing a gripping action on a log when the log is gripped or grappled by the arms.

The limbs or arms 22 and 24 of the carrier frame assembly 16 are hollow and are provided therewithin with hydraulic cylinder and piston assemblies such as that indicated by the reference character 191 in FIG. 3 which is anchored as at 193 by means of a pivot bolt to the corresponding arm portion 24 of the frame as shown in FIG. 3, it being understood that each such arm 22 and 24 is so provided with hydraulic powering mechanism. The piston rod 195 of the assembly 191 is coupled through a suitable link pin to a link member 196 pivoted to the frame 16, as at 198, to guide the piston rod 195; and a short link 200 extends also from the pivot connection to the piston rod 195 to an arcuate link 202 connected thereto at the pivot point 204, the opposite end of the arcuate link 202 being pinned as at 206 to the outboard flange member 76 of the cutter assembly 20. The arms 22 and 24 are provided with arcuate slots 208 to clear the pins 206 through a total angular movement of approximately 90° whereby the cutter assembly 20 as shown in FIG. 3 may be swung from the substantially horizontal position as shown therein to a substantially vertical position.

The assembly as described is capable of shearing a tree and felling it in a direction away from the powered vehicle to which the device is attached and is also capable of swinging movement of the cutter assembly 20 to a desired position for grappling and grabbing the felled tree and dragging or skidding it to a desired point whereafter vertical dispositioning of the cutter assembly 20 will permit the tree to be topped, cut to lengths or otherwise cut as desired. Of course, grappling and skidding of the tree or a log may be effected when the cutter assembly 20 is vertically disposed, as for example when lifting the log or tree. Suitable controls are provided in the powered vehicle for actuating the various hydraulic mechanisms and of course suitable hydraulic lines, not shown, are provided for routing the hydraulic fluid properly to these entities.

In the modification shown in FIGS. 10 and 11, the device is attached to a crawler type tractor vehicle indicated generally by the reference character 210, in which case the mounting frame assembly 212 corresponding to the assembly 12 as shown in FIGS. 1 and 2 is pivotally mounted to the rear portion of the vehicle 210 by means of a vertical king pin assembly 214 and a hydraulic cylinder and piston arrangement 216 is pivotally secured to a suitable bracket ear pair 218 fixed to the assembly 212 and extends for pivotal connection at 220 to the bracket ears 222 secured to the tractor vehicle. Thus, the entire assemblage may be swung from side-to-side about the vertical axis defined by the king pin 214 which is particularly advantageous of operation in conjunction with a crawler type vehicle whose steering characteristics are quite dissimilar from the rubber tired vehicle shown in FIGS. 1 and 2.

The present invention, therefore, is well adapted to carry out the objects and attain the ends and advantages mentioned as well as others inherent therein. While the presently illustrative embodiments of the invention are given for the purpose of disclosure, numerous changes in the details of construction and arrangement of parts may be made which will readily suggest themselves to those skilled in the art and which are encompassed within the spirit of the invention and the scope of the appended claims.

I claim:

1. A tree harvesting machine comprising in combination a vehicle, a cutting-grappling assembly mounted on said vehicle and means for positioning said assembly to fell a tree and grip it for skidding, said cutting-grappling assembly including a frame having spaced apart legs adapted to straddle a tree, blade means operable between said legs, and means for closing the gap between said legs selectively to grip a tree thereat and to back up said blade means; and said positioning means comprising a carrier frame mounted for movement about a horizontal axis on the said vehicle, means for moving said frame about said axis, means for mounting said cutter assembly for movement about a horizontal axis on said carrier frame and means for moving said assembly through an arc of at least ninety degrees about said axis and for arresting its movement and holding it rigidly at any position throughout said arc.

2. Apparatus as in claim 1 wherein the means for closing the gap between the legs comprises a pair of arms, one pivotally mounted on each leg, and means for swinging said arms about their pivots, to open or close the space between the legs.

3. Apparatus as in claim 2 wherein said arms when in closed position are adapted to engage a tree at a location offset from the blade means, to pitch said tree away from the vehicle.

4. Apparatus as in claim 1 wherein the means for moving and holding the cutting assembly with respect to the carrier frame comprises a pair of fluid pressure cylinders.

5. Apparatus as in claim 4 wherein said carrier frame comprises a pair of hollow arms and said cylinders are mounted within the arms.

6. Apparatus as in claim 1 in which said carrier frame is also swingable about a vertical axis on said vehicle.

7. Apparatus as in claim 2 in which the portions of said arms which close the space between the legs are provided on their inner sides with overlapping gripper tips.

8. Apparatus as in claim 2 wherein said arms are provided with extensions going beneath said blade means for engagement with a tree so as to back up said blade means.

9. A tree harvesting machine comprising a power driven vehicle, a mounting frame assembly supported for movement about a vertical pivot on said vehicle, a carrier frame mounted for movement about a horizontal pivot on said mounting frame means for moving said carrier frame about said horizontal axis and retaining it in any desired position, a cutting assembly mounted on said carrier frame for movement about a horizontal axis thereon, said cutting assembly comprising a frame having a pair of parallel plate members, guide rail members affixed to said plate members to provide guide channels, a cutting blade slidable along said channels, a pair of arms pivotally mounted, one on each of said plates, and movable to an open position in which a tree may be received between said plates and to a closed position in which said arms close the space between the plates and form a back-up for said blade, said arms in such closed position engaging a tree received between the plates in a plane below the blade, for tilting the tree away from the vehicle, overlapping gripping fingers on said arms adapted to engage a felled tree for skidding, and means for moving the cutting assembly about its horizontal pivot and for holding it rigidly in any desired adjusted position, said means comprising hydraulic cylinders mounted on the carrier frame.

10. A tree harvesting machine comprising in combination a vehicle, a cutting-grappling assembly mounted on said vehicle and means for positioning said assembly to fell a tree and grip it for skidding, said cutting-grappling assembly including a frame having spaced apart legs adapted to straddle a tree, blade means operable between said legs, and means for closing the gap between said legs selectively to back up said blade means; and means supported on said closing means for gripping a tree when moved to said closed position, said gripping means being operable to grip a tree at a level below said blade means to thereby prevent said cutting-grappling assembly from sliding up the tree due to the tapered configuration of a growing tree.

11. A tree harvesting machine comprising in combination a vehicle, a cutting-grappling assembly mounted on said vehicle and means for positioning said assembly to fell a tree and grip it for skidding, said cutting-grappling assembly including a frame having spaced apart legs adapted to straddle a tree, blade means operable between said legs, and means for closing the gap between said legs selectively to grip a tree thereat, and to back up said blade means; and wherein said closing means includes tree piercing tip means operable for gripping a felled tree to perform said skidding operation.

References Cited

UNITED STATES PATENTS

| | | | |
|---|---|---|---|
| 2,612,194 | 9/1952 | Ingraham et al. | 144—34 |
| 2,820,493 | 1/1958 | Davis | 144—34 |
| 2,882,941 | 4/1959 | Pope | 144—3 |
| 3,183,953 | 5/1965 | McMillan et al. | 144—34 |
| 3,294,131 | 12/1966 | Larson | 144—3 |
| 3,493,020 | 2/1970 | Choat | 144—43 |

FOREIGN PATENTS 139,716  12/1950  Australia.

GERALD A. DOST, Primary Examiner

U.S. Cl. X.R.

144—34